United States Patent
Chowdhury (10) Patent No.: US 8,032,826 B2
(45) Date of Patent: Oct. 4, 2011

(54) STRUCTURE-POSITION MAPPING OF XML WITH FIXED LENGTH DATA

(75) Inventor: Sandeep Chowdhury, Kolkata (IN)

(73) Assignee: International Business Machines Corporation, Armonk, NY (US)

( * ) Notice: Subject to any disclaimer, the term of this patent is extended or adjusted under 35 U.S.C. 154(b) by 808 days.

(21) Appl. No.: 12/035,285

(22) Filed: Feb. 21, 2008

(65) Prior Publication Data

US 2009/0217154 A1 Aug. 27, 2009

(51) Int. Cl.
*G06F 17/00* (2006.01)
(52) U.S. Cl. ............... 715/234; 715/205; 715/255
(58) Field of Classification Search ............ 715/205, 715/234, 255, 272, 736, 237; 707/706, 713, 707/770; 717/141–143
See application file for complete search history.

(56) References Cited

U.S. PATENT DOCUMENTS

| | | | |
|---|---|---|---|
| 6,925,470 B1 | 8/2005 | Sangudi et al. | |
| 7,231,386 B2 * | 6/2007 | Nonomura et al. | 1/1 |
| 7,447,991 B2 * | 11/2008 | Sayers et al. | 715/234 |
| 2004/0103105 A1 | 5/2004 | Lindblad et al. | |
| 2004/0193627 A1 * | 9/2004 | Matsuda | 707/100 |
| 2006/0031763 A1 * | 2/2006 | Yeung | 715/523 |
| 2007/0005622 A1 * | 1/2007 | Fernandes et al. | 707/101 |
| 2009/0030877 A1 * | 1/2009 | Jain et al. | 707/3 |
| 2009/0259616 A1 * | 10/2009 | Chowdhury | 707/1 |

\* cited by examiner

*Primary Examiner* — Thu Huynh
(74) *Attorney, Agent, or Firm* — Cuenot, Forsythe & Kim, LLC (57) ABSTRACT

A method, system and computer program product for mapping and retrieving XML code is presented. Each line of XML code is associated with a node in a node tree. Based on the depth and breadth of the node, the starting and ending positions of the line of XML code are calculated, in order to allow direct access to a particular line of XML code.

6 Claims, 3 Drawing Sheets

STRUCTURE-POSITION MAPPING OF XML WITH FIXED LENGTH DATA

BACKGROUND OF THE INVENTION

The present disclosure relates to the field of computers, and specifically to software. Still more specifically, the present disclosure relates to managing Extensible Markup Language (XML) code Markup programming languages include text mixed with structure and/or layout information that corresponds to the text. Extensible markup language (XML) enables users to encode, serialize, and exchange data across a computer network, such as the Internet. The XML data generated by computer applications can often be represented as fixed byte length data. For example, a user interface for a data entry form may include a maximum length limit for one or more values and/or attribute names. Furthermore, computer applications may add padding characters to one or more element and/or attribute names, such that XML data received from a data entry form has a fixed length equal to a pre-defined maximum length limit.

Conventional computer applications read an entire XML file into local memory when performing navigation and or reading operations of one or more portions (i.e., data nodes) of an XML file. File input/output (I/O) operations is time-intensive and consumes local memory resources. Consequently, reading an entire XML file into local memory when navigating and/or reading a particular data node is inefficient and impairs system performance.

BRIEF SUMMARY OF THE INVENTION

A method, system and computer program product for mapping XML tree structure to the byte/character positions of formatted XML document is presented. The XML data is logically represented as a tree structure with a node ID assigned to each tree node. For each node ID, the starting and ending byte/character positions are calculated, in order to allow direct access to a particular XML node or a group of successive XML nodes, such as node groups within an XML fragment.

The above as well as additional objectives, features, and advantages of the present invention will become apparent in the following detailed written description.

BRIEF DESCRIPTION OF THE SEVERAL VIEWS OF THE DRAWINGS

The invention itself, as well as a preferred mode of use, further objects, and advantages thereof, will best be understood by reference to the following detailed description of an illustrative embodiment when read in conjunction with the accompanying drawings, wherein.

DETAILED DESCRIPTION OF THE INVENTION

As will be appreciated by one skilled in the art, the present invention may be embodied as a method, system, or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product on a computer-usable storage medium having computer-usable program code embodied in the medium.

Any suitable computer usable or computer readable medium may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to the Internet, wireline, optical fiber cable, RF, etc.

Computer program code for carrying out operations of the present invention may be written in an object oriented programming language such as Java® (Java® is a trademark or registered trademark of Sun Microsystems, Inc. in the United States and other countries), Smalltalk, C++ or the like. However, the computer program code for carrying out operations of the present invention may also be written in conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network (LAN) or a wide area network (WAN), or the connection may be made to an external computer (for example, through the Internet using an Internet Service Provider).

The present invention is described below with reference to flowchart illustrations and/or block diagrams of methods, apparatuses (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

Figure 1:
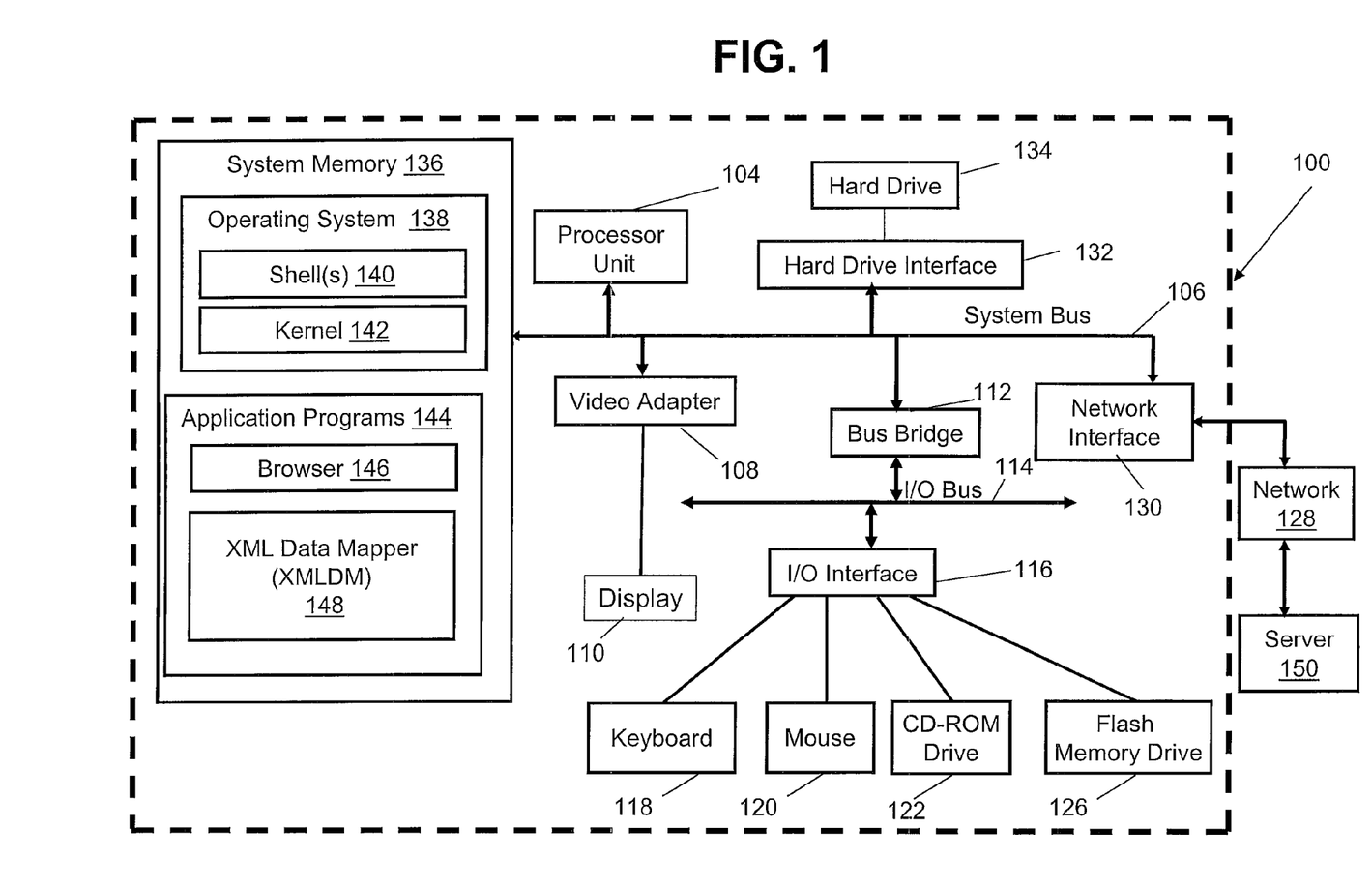
FIG. 1 depicts an exemplary physical computer in which the present invention may be implemented.

With reference now to FIG. 1, there is depicted a block diagram of an exemplary computer 100, with which the present invention may be utilized. Computer 100 includes a processor unit 104 that is coupled to a system bus 106. A video adapter 108, which drives/supports a display 110, is also coupled to system bus 106. System bus 106 is coupled via a bus bridge 112 to an Input/Output (I/O) bus 114. An I/O interface 116 is coupled to I/O bus 114. I/O interface 116 affords communication with various I/O devices, including a keyboard 118, a mouse 120, a Compact Disk—Read Only Memory (CD-ROM) drive 122, and a flash memory drive 126. The format of the ports collected to I/O interface 116 may be any known to those skilled in the art of computer architecture, including but not limited to Universal Serial Bus (USB) ports.

Computer 100 is able to communicate with a server 150 via a network 128 using a network interface 130, which is coupled to system bus 106. Network 128 may be an external network such as the Internet, or an internal network such as an Ethernet or a Virtual Private Network (VPN). Server 150 may be architecturally configured in the manner depicted for computer 100.

A hard drive interface 132 is also coupled to system bus 106. Hard drive interface 132 interfaces with a hard drive 134. In one embodiment, hard drive 134 populates a system memory 136, which is also coupled to system bus 106. System memory 136 is defined as a lowest level of volatile memory in computer 100. This volatile memory may include additional higher levels of volatile memory (not shown), including, but not limited to, cache memory, registers, and buffers. Code that populates system memory 136 includes an operating system (OS) 138 and application programs 144.

OS 138 includes a shell 140, for providing transparent user access to resources such as application programs 144. Generally, shell 140 is a program that provides an interpreter and an interface between the user and the operating system. Shell 140 provides a system prompt, interprets commands entered by keyboard 118, mouse 120, or other user input media, and sends the interpreted command(s) to the appropriate lower levels of the operating system (e.g., kernel 142) for processing. As depicted, OS 138 also includes kernel 142, which includes lower levels of functionality for OS 138. Kernel 142 provides essential services required by other parts of OS 138 and application programs 144. The services provided by kernel 142 include memory management, process and task management, disk management, and I/O device management.

Application programs 144 include a browser 146. Browser 146 includes program modules and instructions enabling a World Wide Web (WWW) client (i.e., computer 100) to send and receive network messages to the Internet. Computer 100 may utilize HyperText Transfer Protocol (HTTP) messaging to enable communication with server 150. Application programs 144 in system memory 136 also include an XML Data Mapper (XMLDM) 148, which executes the steps described below in FIGS. 2-3.

In one embodiment, computer 100 is able to download XMLDM 148 from a remote service provider server 150, preferably in an "on demand" basis. In another embodiment, server 150 is able to execute XMLDM 148, thus reducing demand on hardware and software resources directly attributed to computer 100.

The hardware elements depicted in computer 100 are not intended to be exhaustive, but rather are representative to highlight essential components required by the present invention. For instance, computer 100 may include alternate memory storage devices such as magnetic cassettes, Digital Versatile Disks (DVDs), Bernoulli cartridges, and the like. These and other variations are intended to be within the spirit and scope of the present invention. Note that the hardware architecture for service provider server 150 may be substantially similar to that shown for computer 100.

Figure 2:
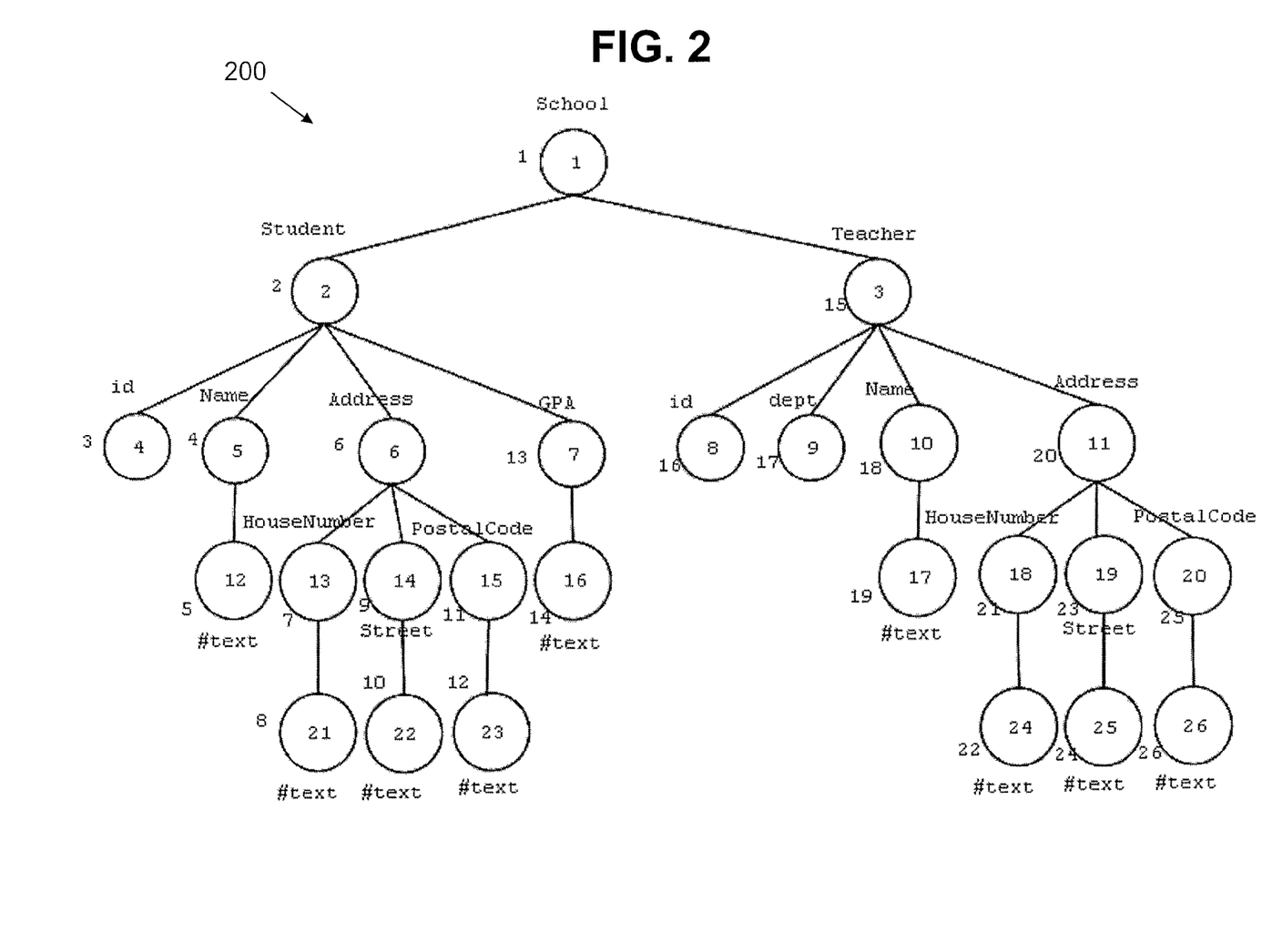
FIG. 2 illustrates a node tree representing XML data.

As disclosed herein, the present invention presents a technique to map structural path expression of XML to the start and end positions of the corresponding XML data, when the XML data has fixed length and its structure is represented as a node tree such as that shown as tree 200 in FIG. 2. The start and end positions can be byte positions in which case the fixed length should be specified as the number of bytes. The start and end positions can also be character positions in which case the fixed length should be specified as the number of characters.

An example of a fixed byte length XML data is:
All element names are of 12 bytes
All element values are of 15 bytes
All attribute names are of 4 bytes
All attribute values are of 5 bytes
An example of fixed character length XML data is
All element names are of 12 characters
All element values are of 15 characters
All attribute names are of 4 characters
All attribute values are of 5 characters The original XML could have been created with fixed length data or the fixed length data is achieved by other means like adding extra padding characters. Examples of structural path expressions are (the abbreviations are for brevity and not part of standards):
S/n--->Find the "nth" node within an XML having structure code "S".
S/F[2]-->Find the second fragment with fragment structure code "F" within an XML having structure code "S".
or more complex path expressions like
S/F1[2]/F2[3] and
S/F1[2]/F2[3]/n where "n" stands for the "nth" node within fragment code F2.
The output of structural path expressions should be one or more node identifiers. When the output has multiple node identifiers, the node identifiers should be sequential.
The structure code "S" of XML should have the properties described below as "Exemplary Structure Code Properties."
Oftentimes the XML data generated from an application can easily be represented as fixed byte length data. For example, a user may fill up forms through a user interface whose values have a maximum-length limit. Furthermore, the attribute names in the form are constrained within a maximum length. When this data is captured as XML, it is possible to add padding characters to the element and attribute names and values such that data of the same type (e.g., element name, element value, attribute name, attribute value) has fixed length equal to the maximum-length limit in the form.

When XML data needs to be read from files, reading the entire XML file in memory for the purpose of navigating and reading a particular node and fragment is both time-intensive and memory-intensive. This is because file input-output operations are significantly time-intensive operations compared to in-memory computations. Also reading more data in memory means consumption of more memory resources.

If the starting and ending byte positions of the nodes and fragments of the XML data has been mapped to the structural expressions for those nodes and fragments, then the present invention allows for retrieval and updating operations to be done on the file without reading the entire file in memory. For retrieve operations, the file pointer can directly go to the starting position of the node or fragment and read the number of bytes equal to the (starting byte position–ending byte position +1). Similarly for update operation, the file pointer seeks the starting position of the node or fragment and updates them with the new value. This invention thus speeds up the XML data retrieval and update operation, and also conserves memory resources since the number of file read-write operations is minimized. Deficient memory resources in the system may in turn slow-down the file retrieval/updating process if the processor needs to frequently swap in-memory data to the hard disk.

In the example in which XML data is converted into fixed-length by adding padding characters, the only redundant data loaded are the padding characters within the actual XML data. If the variation in length of the XML data is not very high, then this redundancy is small compared to loading the entire file (without padding characters) for purpose of navigation. The padding characters are removed after the data is read in memory.

From the user's point of view, the user need not know about the structure-position mapping which is done behind the scenes. The user only deals with the structural path expressions for retrieve and update operations on the XML file. Identifying a node or fragment with structural path expression is easy compared to dealing with the byte positions within the XML file. Also graphical tools can be built which can generate the structural path expressions when the user browses a node in a template XML (template XML has the same element and attribute names but the values are dummy, like assigning * to all values within the XML).

In many real-life applications the XML data needs to be retrieved or updated from files. Therefore it is not possible to speed up XML data retrieval/updating by in-memory indexing without reading from files.

One example scenario is when XML data is generated as event files by an external application and read and updated through file adapters.

To use the technique described herein effectively for file retrieve and update operations, the following conditions need to be ensured:

1. Fixed length XML data. The file is generated with fixed length XML data.
2. No new lines and unnecessary spaces in XML data. The XML files are formatted such that they do not have any new lines between tags or redundant whitespaces.
3. Known structure code of XML data. The structure code of the XML data should be known beforehand, such as during design time of the generated XML. It should not be determined by reading the file on which retrieval and updating operation is being done. The structure code should have the properties described below as "Exemplary Structure Code Properties."
4. Known header length. The header length of the XML data should preferably be known beforehand. If this condition is not satisfied, the header length needs to be determined by searching the XML file at runtime.
5. Known structural path expressions. If the structural path expressions are known, the corresponding byte positions in the file can be pre-computed (the output of the structural path expressions should be one or more node identifiers; in case the output consist of multiple node identifiers, the node identifiers should be sequential). Pre-computation has the following advantages. (a) Time saving: The positions from which data needs to be retrieved is ready at runtime. (b) Pre-validation: If this condition is not satisfied there will be an additional overhead of computation at runtime.
6. Known encoding of the XML data. The encoding of the XML data is known beforehand. This is required in case the start and end positions are computed as byte positions. If this condition is not satisfied the XML header needs to be parsed for reading the encoding value.

If all the above conditions are satisfied, the positions of the various structural path expressions can be pre-computed during configuration time and hence there is no need of any additional computation or file reading operations (like reading the XML header) at runtime. This will speed up the XML retrieval and update operations at runtime.

Exemplary Structure Code Properties

The proposed technique can use any method of representing an XML structure which satisfies the following conditions:

1. The method of representation can identify each node of the XML tree by a node identifier (called a node Id for brevity) as shown for an exemplary XML data tree 200 in FIG. 2.
2. From the method of representation it is possible to determine the depth-first order of each node of the XML tree.
3. From the method of representation it is possible to identify the parent of a non-root node.
4. From the method of representation it is possible to identify the child of a non-leaf node.
5. From the method of representation it is possible to identify whether a node is an element name, element value or an attribute node of the XML tree (i.e., node type).
6. From the method of representation it is possible to identify the level of each node in the XML tree.

With only these assumptions, the present invention allows a user to identify the start and end byte/character positions of a single node of the XML tree. That is, a user can determine the byte/character positions for an element name, element value, attribute name and attribute value.

If a user also wants to determine the start and end byte/character positions of a fragment within the XML, the following are the further assumptions on the representation:

7. From the method of representation it is possible to identify a fragment of the XML.
8. From the method of representation it is possible to identify the node Id of the root node of the fragment and the last node of the fragment, the node order being the depth-first order of tree traversal.

Some of the ways of selecting a portion of the XML data are (the abbreviated syntax is for illustrative purpose only and not based on any standards):

(a) S/n=The node n (depth-first order) within XML with structure S.

(b) S/m=The node m (breadth-first order) within XML with structure S.
(c) S/F[2]=The second fragment with structure F within XML with structure S.
(d) S/f=The fragment with fragment Id f within XML with structure S.
(e) S/F1[2]/F2[3]=The third fragment with structure F2 contained within the second fragment with structure F1 which in turn is contained within the XML with structure S.
(f) S/f1/f2=S/f1 represents a fragment with fragment Id f1 within the XML tree with structure f2. Now if a user isolate (logically by computation) the fragment f1 and relabel the nodes of the new tree, then S/f1/f2 represents the fragment with fragment Id f2 within the new tree.

Similarly other variations are:
(g) S/F1[2]/F2[3]/n
(h) S/F1[2]/f2 *etc*.

1.1. Example XML (Unformatted)

Based on the assumptions and descriptions described above, assume now that an exemplary unformatted XML, shown for purposes of illustration only and not to be construed as limiting the scope of the present invention, has the following structure:

```
<School>
    <Student id="S001">
        <Name>Peter Blazer</Name>
        <Address>
            <HouseNumber>12/3</HouseNumber>
            <Street>Green Avenue</Street>
            <PostalCode>120057</PostalCode>
        </Address>
        <GPA>6.8</GPA>
    </Student>
    <Teacher>
        <id="T001">
        <dept="D001">
        <Name>Tarun Paul</Teacher>
        <Address>
            <HouseNumber>22/5</HouseNumber>
            <Street>LakeView Road</Street>
            <PostalCode>320066</PostalCode>
        </Address>
    </Teacher>
</School>
```

(Note that the actual formatted XML will not have the redundant whitespaces.)

This XML data is represented in FIG. 2 as tree 200. Note that <School> is represented at a top level of the tree 200; <Student> and <Teacher> are represented at the next lower level; the student's <Student id>, <Name>, <Address> and <GPA>, as well as the teacher's <id>, <dept>, <Name> and <Address> are represented at the next lower level; etc. Thus, each line of code in the XML file is represented by a node in the tree 200 at a particular depth level.

1.2. Example XML (Formatted)

Illustrated now are examples with byte positions and an encoding such that one character encodes to one byte. When one character encodes to one byte, the same computations hold for character positions also. For calculation of byte positions when one character encodes to more than one byte, some adjustments are required for encoding which are specified in this description.

The fixed length for the formatted XML is taken as
Attribute Names=5 bytes
Attribute Values=4 bytes (without quotes)
Element Names=12 bytes
Element Values=15 bytes Assume that the XML data is made fixed length by adding padding characters. Padding character=$ The formatted XML will not have newline characters or beautifying spaces as shown in the unformatted characters.

To illustrate our example step-by-step, assume an encoding such that one character in the XML is encoded with one byte. This assumption is only for simplicity and clarity in illustration.

Thus, a formula (described below) is arrived at in which part of the formula varies for variation of encoding.

Table 1, shown below, shows the starting positions of node names/values. The node names are shown with angle brackets for clarity in computation of starting positions which are not part of the node names. Attribute values are shown with quotes for clarity in computation of starting positions which are not part of the attribute values.

TABLE 1

Illustrating computation of starting positions of data in XML file

| Node Id (depth first) (1) | Node Type (2) | Node Level (3) | Node Name/Value (4) | Total characters (5) | Cumulative or Ending position (6) | Starting position (bytes) (7) | Node Id (breadth first) (8) |
|---|---|---|---|---|---|---|---|
| 1 | Element Name | 1 | <School$$$$$$> | 12 chars + 2 brackets = 14 | 14 | 1 + 1 = 2 (angle bracket + 1) | 1 |
| 2 | Element Name | 2 | <Student$$$$$> | 12 chars + 1 bracket + 1 space = 14 | 28 | 14 + 1 + 1 = 16 (cumulative + angle bracket + 1) | 2 |
| 3 | Attribute | 3 | id$$$=" | 5 + 2 = 7 | 35 | 28 + 1 = 29 | 4 |
| . | . | . | S001"> | 4 + 2 = 6 | 41 | 35 + 1 = 36 | . |
| 4 | Element Name | 3 | <Name$$$$$$$$> | 12 chars + 2 brackets = 14 | 55 | 41 + 1 + 1 = 43 | 5 |
| 5 | Element Value | 4 | Peter Blazer$$$ | 15 chars = 15 | 70 | 55 + 1 = 56 | 12 |
| . | . | Decrease | </Name$$$$$$$$> | 12 chars + 3 = 15 | 85 | 70 + 3 = 73 | . |
| 6 | Element Name | 3 | <Address$$$$$> | 12 + 2 = 14 | 99 | 85 + 2 = 87 | 6 |
| 7 | Element Name | 4 | <HouseNumber$> | 12 + 2 = 14 | 113 | 99 + 2 = 101 | 13 |

TABLE 1-continued

Illustrating computation of starting positions of data in XML file

| Node Id (depth first) (1) | Node Type (2) | Node Level (3) | Node Name/Value (4) | Total characters (5) | Cumulative or Ending position (6) | Starting position (bytes) (7) | Node Id (breadth first) (8) |
|---|---|---|---|---|---|---|---|
| 8 | Element Value | 5 | 12/3$$$$$$$$$$$ | 15 | 128 | 113 + 1 = 114 | 21 |
| . | . | Decrease | </HouseNumber$> | 12 + 3 = 15 | 143 | 128 + 3 = 131 | . |
| 9 | Element Name | 4 | <Street$$$$$$> | 12 + 2 = 14 | 157 | 143 + 2 = 145 | 14 |
| 10 | Element Value | 5 | Green Avenue$$$ | 15 | 172 | 157 + 1 = 158 | 22 |
| . | . | Decrease | </Street$$$$$$> | 12 + 3 = 15 | 187 | 172 + 3 = 175 | . |
| 11 | Element Name | 4 | <PostalCode$$> | 12 + 2 = 14 | 201 | 187 + 2 = 189 | 15 |
| 12 | Element Value | 5 | 120057$$$$$$$$$ | 15 | 216 | 201 + 1 = 202 | 23 |
| . | . | Decrease | </PostalCode$$> | 12 + 3 = 15 | 231 | 216 + 3 = 219 | . |
| . | . | Decrease | </Address$$$$$> | 12 + 3 = 15 | 246 | 231 + 3 = 234 | . |
| 13 | Element Name | 3 | <GPA$$$$$$$$$> | 12 + 2 = 14 | 260 | 246 + 2 = 248 | 7 |
| 14 | Element Value | 4 | 6.8$$$$$$$$$$$$ | 15 | 275 | 260 + 1 = 261 | 16 |
| . | . | Decrease | </GPA$$$$$$$$$> | 12 + 3 = 15 | 290 | 275 + 3 = 278 | . |
| . | . | Decrease | </Student$$$$$> | 12 + 3 = 15 | 305 | 290 + 3 = 293 | . |
| 15 | Element Name | 2 | <Teacher$$$$$ | 12 + 2 = 14 | 319 | 305 + 2 = 307 | 3 |
| 16 | Attribute | 3 | id$$$=" | 5 + 2 = 7 | 326 | 319 + 1 = 320 | 8 |
| . | . | . | T001" | 4 + 2 = 6 (quote + trailing space) | 332 | 326 + 1 = 327 | . |
| 17 | Attribute | 3 | dept$=" | 5 + 2 = 7 | 339 | 332 + 1 = 333 | 9 |
| . | . | . | D001"> | 4 + 2 = 6 | 345 | 339 + 1 = 340 | . |
| 18 | Element Name | 3 | <Name$$$$$$$$> | 12 + 2 = 14 | 359 | 345 + 2 = 347 | 10 |
| 19 | Element Value | 4 | Tarun Paul$$$$$ | 15 | 374 | 359 + 1 = 360 | 17 |
| . | . | Decrease | </Name$$$$$$$$> | 12 + 3 = 15 | 389 | 374 + 3 = 377 | . |
| 20 | Element Name | 3 | <Address$$$$$> | 12 + 2 = 14 | 403 | 389 + 2 = 391 | 11 |
| 21 | Element Name | 3 | <HouseNumber$> | 12 + 2 = 14 | 417 | 403 + 2 = 405 | 18 |
| 22 | Element Value | 5 | 22/5$$$$$$$$$$$ | 15 | 432 | 417 + 1 = 418 | 24 |
| . | . | Decrease | </HouseNumber$> | 12 + 3 = 15 | 447 | 432 + 3 = 435 | . |
| 23 | Element Name | 4 | <Street$$$$$$> | 12 + 2 = 14 | 461 | 447 + 2 = 449 | 19 |
| 24 | Element Value | 5 | LakeView Road$$$ | 15 | 476 | 461 + 1 = 462 | 25 |
| . | . | Decrease | </Street$$$$$$> | 12 + 3 = 15 | 491 | 476 + 3 = 479 | . |
| 25 | Element Name | 4 | <PostalCode$$> | 12 + 2 = 14 | 505 | 491 + 2 = 493 | 20 |
| 26 | Element Value | 5 | 320066$$$$$$$$$ | 15 | 520 | 505 + 1 = 506 | 26 |
| . | . | . | </PostalCode$$> | 12 + 3 = 15 | 535 | 520 + 3 = 523 | . |
| . | . | . | </Address$$$$$> | 12 + 3 = 15 | 550 | 535 + 3 = 538 | . |
| . | . | . | </Teacher$$$$$> | 12 + 3 = 15 | 565 | 550 + 3 = 553 | . |
| . | . | . | </School$$$$$$> | 12 + 3 = 15 | 580 | 565 + 3 = 568 | . |

As described herein, Table 1 corresponds with tree 200 shown in FIG. 2. The breadth-first node Id for each node is shown inside the node whereas the depth-first node Id is shown outside the node. For example, "Teacher" node is breadth-first node Id 3 and depth-first node Id 15. The term "breadth-first" refers to nodes being classified row-by-row, while the term "depth-first" refers to nodes being classified down to each last non-root node. Thus, the "Teacher" node is reached "breadth-first" after the top row ("School" node) and the other node ("Student" node) in the same row as the "Teacher" node. The "Teacher" node is reached "depth-first" only after each "column" of nodes, read from left to right, are completely read down to their lowest branches/leaves, as illustrated by the "depth-first" node Id's for the 15 nodes read before the fifteenth "Teacher" node. Thus, a "breadth-first" node identifier is defined as a node identifier that is based on the "breadth-first" classification of nodes on the node tree, and a "depth-first" node identifier is defined as a node identifier that is based on the "depth-first" classification of nodes on the node tree.

Using both the breadth-node Id's and the depth-node Id's for nodes in the tree 200, the present invention is able to track to a particular node. As described in greater details in the flow-chart of FIG. 3 below, the present process for locating such a node includes:

(a) Assigning node Ids to XML. These node Ids are breadth-first order.
(b) Mapping breadth-first node Ids to depth-first node Ids (column 8 to column 1 in the above table).
(c) Determining the level of a node.

(d) Determining the parent of a given node.
(e) Determining the child of a given node.

1.3. Steps to Determine the Starting Position of a Node

Now illustrated is a method of computation of the starting position of a node by computing the starting positions of some nodes starting with node 10 (depth-first in column 1 of Table I). Refer to the table and FIG. 2. The total number of depth-first node before node 10 are 9. Out of these 9 nodes:

1. The number of Element Nodes (EN)=6 (nodes 1, 2, 4, 6, 7, 9 in column 1)
2. The number of Element Values (EV)=2 (nodes 5 and 8 in column 1)
3. The number of Attribute Nodes (AN)=1 (node 3 in column 1)
4. The number of level decreases (LD)=2 (between nodes 5, 6 and 8, 9 in column 1) (A level decrease indicates a closing tag)

The starting position of a node is given by $$\text{Starting position of an Element Name} = \text{num}EN^*(\text{maxLength}EN+2) + \text{num}EV^*\text{maxLength}EV + \text{num}AN^*(\text{maxLength}AN + \text{maxLength}AV+4) + \text{num}LD^*(\text{maxLength}EN+3)+2$$

$$\text{Starting position of an Element Value} = \text{num}EN^*(\text{maxLength}EN+2) + \text{num}EV^*\text{maxLength}EV + \text{num}AN^*(\text{maxLength}AN + \text{maxLength}AV+4) + \text{num}LD^*(\text{maxLength}EN+3)+1$$

$$\text{Starting position of an Attribute Name} = \text{num}EN^*(\text{maxLength}EN+2) + \text{num}EV^*\text{maxLength}EV + \text{num}AN^*(\text{maxLength}AN + \text{maxLength}AV+4) + \text{num}LD^*(\text{maxLength}EN+3)+1$$

$$\text{Starting position of an Attribute Value} = \text{Starting position of an Attribute Name} + \text{maxLength}AN+2$$

where numEN=Number of Element Nodes before the node whose starting position needs to be computed (nodes are in depth-first order)
numEV=Number of Element Values before the node whose starting position needs to be computed (nodes are in depth-first order)
numAN=Number of Attributed before the node whose starting position needs to be computed (nodes are in depth-first order)
numLD=Number of Level Decreases before the node whose starting position needs to be computed (nodes are in depth-first order)
maxLengthEN=Maximum byte length allocated for an Element Node
maxLengthEV=Maximum byte length allocated for an Element Value
maxLengthAN=Maximum byte length allocated for an Attribute Name
maxLengthAV=Maximum byte length allocated for an Attribute Value When the number of nodes are determined the nodes need to be arranged in depth-first order as shown in column 1 of the table.

Adjustments for Encoding

The above expressions are given with the assumption that the encoding is such that 1 character is encoded with 1 byte. (This may be the case when the encoding is say UTF-8)

The adjustments for other encodings are as follows:

1. numEN*(maxLengthEN+2)

The +2 in the above expression represents the characters <, > or <, single space (Refer to the table). Hence +2 may change in the above expression depending on the number of bytes taken to encode these characters with the user-specified encoding.

2. numAN*(maxLengthAN+maxLengthAV+4)

The +4 in the above expression represents the characters =, single or double start quote, single or double end quote, >. Hence +4 may change in the above expression depending on the number of bytes taken to encode these characters with the user-specified encoding.

3. numLD*(maxLengthEN+3)

The +3 in the above expression represents the characters <, /, > Hence +3 may change in the above expression depending on the number of bytes taken to encode these characters with the user-specified encoding.

4. The Trailing +2 in the Starting Position of an Element Name Expression

The trailing +2 represents the character <+1. Hence if the user-specified encoding taken n bytes to encode <, the +2 needs to be changed to n+1.

5. The Trailing +2 in the Starting Position of an Attribute Value Expression

The trailing +2 represents the characters=and single or double quotes. Hence if the user-specified encoding takes n bytes to represent the characters mentioned above, +2 needs to be changed to +n/

Example Computations of Starting Positions of Some Nodes

With the maxLength allocations for this example and assuming 1 character encodes to 1 byte, the following is developed as:

Starting position of node 10 which is an Element Value is
Starting position of node 10=6*(12+2)+2*(15)+1*(5+4+4)+2*(12+3)+1=84+30+13+30+1=158
Starting position of node 6 which is an Element Name is
Starting position of node 6=3*(12+2)+1*(15)+1*(5+4+4)+1*(12+3)+2=42+15+13+15+2=87
Starting position of node 17 which is an Attribute Name is
Starting position of node 17=9*(12+2)+5*(15)+2*(5+4+4)+7*(12+3)+1=126+75+26+105+1=333
Starting position of the Attribute Value of node 17 which is an Attribute Node is
Starting position of value of node 17=Starting position of node 17+maxLength of Attribute Name of node 17+2=333+5+2=340

1.4. Steps to Determine the Ending Position of a Node

Ending Position=Starting Position+maxLength of node−1
The Ending Position of node 10 is thus
Ending Position of node 10=158+15−1=172

1.5. Steps to determine the starting position of a fragment

A fragment has a root node which is the fragment Id of the fragment. The starting position of the fragment is the starting position of its root node and computed in the same way as in section 1.2.

For example the starting position of fragment with node Id 6 (depth-first)=87 as computed in section 1.2.

1.6. Steps to Determine the Ending Position of a Fragment

Ending Position of fragment=Ending Position of the last node (depth-first node Id) in the fragment+numLD*(maxLengthEN+3)

where numLD=Number of level decreases between the last node of the fragment and the next node.

If the last node of the fragment is also the last node of the tree, the next node is taken as the root node (whose level is 1) (as mentioned previously adjustment for encoding needs to be applied for this expression)

For example, the ending position of fragment with node Id 6 (depth-first) is computed by considering the last node of the fragment which is 12 (see FIG. 2). Therefore the Ending Position of fragment 6 (depth-first)=Ending Position of node 12 (depth-first)+numLD*(maxLengthEN+3)

Thus, to compute the example:

Starting Position of node 12 (depth-first node Id)=7*(12+2)+ 3*(15)+1*(5+4+4)+3*(13+3)+1=98+45+13+45+1=202

Ending Position of node 12=202+15−1=216

The next node is 13 (depth first).

Level of node 12=5

Level of node 13=3

Number of level decrease=5−3=2 numLD*(maxLengthEN+3)=2*(12+3)=30

Therefore Ending Position of fragment 6; (depth-first) =216+30=246

1.7. Retrieve Operation

Let

School=Code of the School

Student=Code of the Student fragment

Teacher=Code of the Teacher fragment

Address=Code of the Address fragment ps (a) Retrieval of a Node

Assume that the User wants to retrieve the Street of the Address of the Student. This corresponds to node 10 (depth-first). From the computations of sections 1.3 and 1.4, this leads to:

Starting position of node 10=158

Ending position of node 10=172

If the header length of the XML file is h bytes (the body starts immediately after the header length without space)

Actual starting position of node 10=h+158

Actual ending position of node 10=h+172

From the starting and ending positions the value of node 10 is directly read from the XML file. In the example shown, this would be Green Avenue$$$. The padding characters $ are then removed and one gets the actual value Green Avenue.

Retrieve Strings

The user need not input the node Ids explicitly if proper tooling is available and user has an XML template file. For example, let the user have the following XML template file:

```
<School>
  <Student id="*">
    <Name>*</Name>
    <Address>
      <HouseNumber>*</HouseNumber>
      <Street>*</Street>
      <PostalCode>*</PostalCode>
    </Address>
    <GPA>*</GPA>
  </Student>
  <Teacher id="*" dept="*">
    <Name>*</Teacher>
    <Address>
      <HouseNumber>*</HouseNumber>
      <Street>*</Street>
      <PostalCode>*</PostalCode>
    </Address>
  </Teacher>
</School>
```

The user can graphically select a node and the tool can generate the corresponding node Id.

(b) Retrieval of a Fragment

Retrieval of a fragment is similar to the retrieval of the node. The only difference is that the padding characters need to be removed from all the nodes of the fragment. As in the case of nodes, the user can take advantage of tooling to generate the fragment Id of a fragment.

1.8. Update Operation

Update operation is similar to retrieve operation. The value to be updated is padded to make it fixed length. For fragment all the nodes of the fragment need to be padded. The starting and ending positions are determined and the new value is replaced between the starting and ending positions (inclusive).

Figure 3:
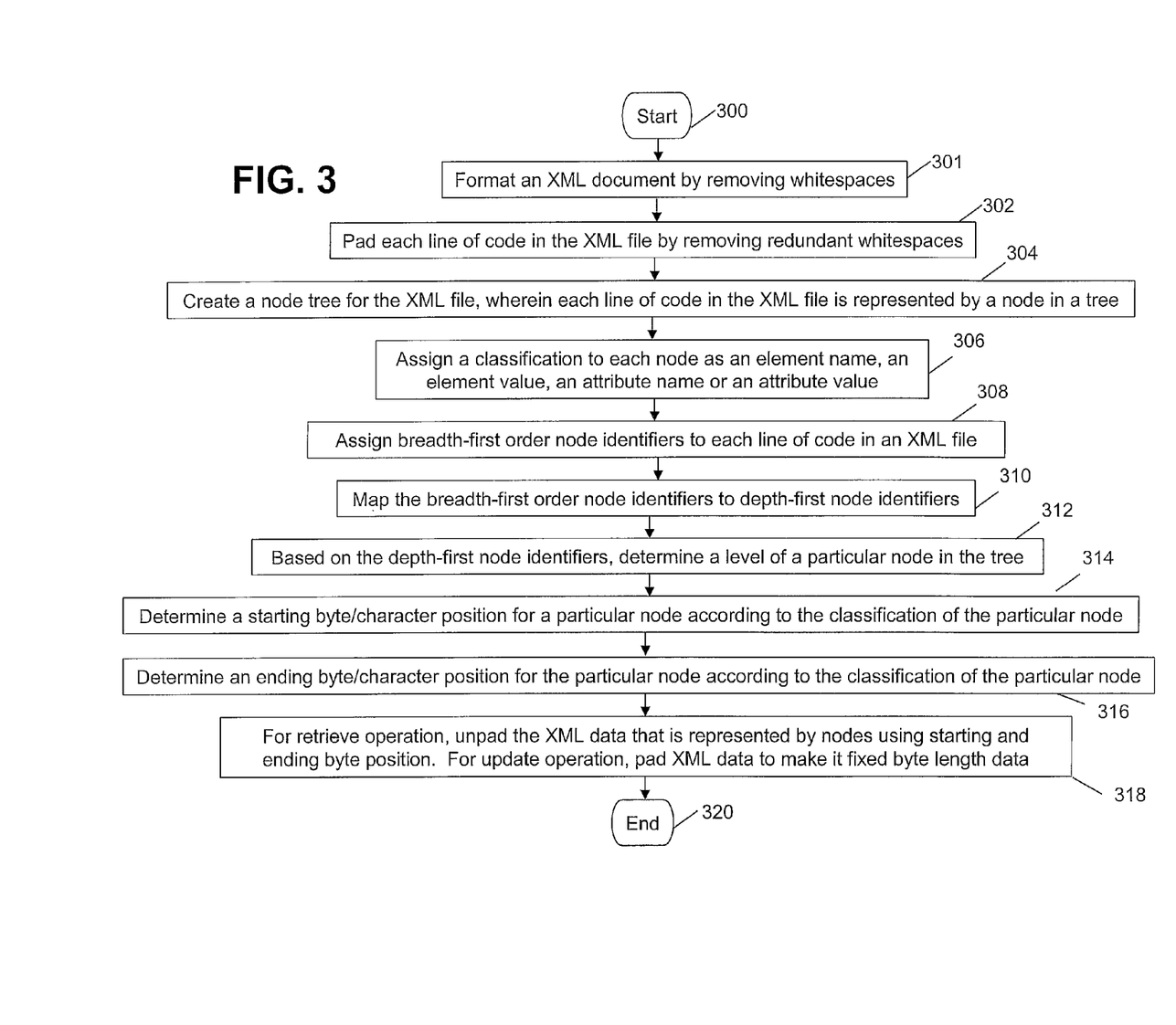
FIG. 3 is a high-level flow-chart of exemplary steps taken by the present invention to map and retrieve XML code.

A summary of the process described above for mapping and retrieving XML code is shown in the flow-chart of FIG. 3. After initiator block 300, an XML document is formatted by removing redundant whitespaces (including newline characters). Each line of code in an XML file is padded with unexecutable code to bring a total size of each line of code to a predetermined size (block 302). That is, the redundant whitespaces are removed and padded to made the XML file a fixed-byte length. Using these padded lines of code, a node tree is created for the XML file, such that each line of code in the XML file is represented by a node in a tree (block 304).

As described in block 306, a classification is assigned to each node in the node tree. This classification is either an element name, an element value, an attribute name or an attribute value.

As described above with reference to Table 1, breadth-first order node identifiers are assigned to each node in the node tree (block 308), and the breadth-first order node identifiers are mapped to corresponding depth-first node identifiers (block 310). Based on the corresponding depth-first node identifiers, a node level of a particular node in the node tree is the determined (block 312). Thereafter, the node level and depth-first node identifier of the particular node are utilized to determine a starting byte/character position for the particular node in the node tree (block 314). The starting byte/character position describes the start position (as bytes) of a particular node in an XML document. As described at block 316, the node level and depth-first node identifier of the particular node are also utilized to determine an ending byte/character position for the particular node in the node tree, where the ending byte/character position describes an end position (as bytes) of a particular node in an XML document. The particular XML data that is associated with the particular node/nodes is then retrieved in accordance with the starting byte position and the ending byte position, and the padding characters is removed (block 318). Thus, for a retrieve operation, unpad the XML data that is represented by one or more nodes using the starting and ending byte position. For update operations, pad the XML data that needs to be updated to make it fixed byte length data. The process ends at terminator block 320.

Note that in one embodiment, the starting byte position described at block 314 is determined according to how the node is classified (i.e., element name, element value, attribute name, attribute value). Thus, the starting byte position for an element name is calculated by the formula:

$$\text{Starting position of the element name} = \text{num}EN^*(\text{maxLength}EN+2) + \text{num}EV^*\text{maxLength}EV + \text{num}AN^*(\text{maxLength}AN + \text{maxLength}AV + 4) + \text{num}LD^*(\text{maxLength}EN+3) + 2.$$

The starting byte position for the element value is determined by the formula:

$$\text{Starting position of an Element Value} = \text{num}EN^*(\text{maxLength}EN+2) + \text{num}EV^*\text{maxLength}EV + \text{num}AN^*(\text{maxLength}AN + \text{maxLength}AV + 4) + \text{num}LD^*(\text{maxLength}EN+3) + 1.$$

The starting byte position for the attribute name is determined by the equation:

Starting position of an Attribute Name=num$EN$*(maxLength$EN$+2)+num$EV$*maxLength$EV$+num$AN$*(maxLength$AN$+maxLength$AV$+4)+num$LD$*(maxLength$EN$+3)+1.

The starting byte position for the attribute value is determined by the equation:

Starting position of an Attribute Value=Starting position of the Attribute Name+maxLength$AN$ +2.

Note that in these equations/formula:
numEN equals a Number of Element Nodes before the particular node whose starting position needs to be computed, wherein all nodes are in depth-first order;
numEV equals a Number of Element Values before the particular node whose starting position needs to be computed, wherein all nodes are in depth-first order;
numAN equals a Number of Attributed before the particular node whose starting position needs to be computed, wherein all nodes are in depth-first order;
numLD equals a Number of Level Decreases before the particular node whose starting position needs to be computed, wherein all nodes are in depth-first order;
maxLengthEN equals a Maximum byte length allocated for an Element Node;
maxLengthEV equals a Maximum byte length allocated for an Element Value;
maxLengthAN equals a Maximum byte length allocated for an Attribute Name; and
maxLengthAV equals a Maximum byte length allocated for an Attribute Value.

As thus described, presented herein is a method of Structure-Position mapping of XML files with fixed-length data. The Structure-Position mapping has two aspects:

1. The Structure part allows the user to retrieve portions of XML data using structural path expressions. It is therefore easy (and easier with graphical tooling) for the user to specify a particular portion of the data in the XML. The user does not need to know anything about the data positions in the XML file but selects a portion of data from the XML using structure path expressions.

2. The Position part allows direct retrieval of data from the XML file with little redundancy (that of padding if the data is not already of fixed length). This increases the throughput and conserves the memory.

Note that the flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

Having thus described the invention of the present application in detail and by reference to preferred embodiments thereof, it will be apparent that modifications and variations are possible without departing from the scope of the invention defined in the appended claims.

What is claimed is:

1. A method of mapping and retrieving Extensible Markup Language (XML) code, the method comprising:
    formatting an XML document to remove redundant whitespaces, wherein whitespaces comprise new line characters;
    padding each line of code in the XML document with unexecutable code to bring a total size of each line of code to a predetermined size;
    creating, after said padding, a node tree for the XML document, wherein each line of code in the XML document is represented by a node in the node tree;
    assigning breadth-first order node identifiers to each node in the node tree;
    mapping the breadth-first order node identifiers to corresponding depth-first node identifiers;
    based on the corresponding depth-first node identifiers, determining a node level of a particular node in the node tree;
    utilizing the node level and depth-first node identifier of the particular node to determine a starting byte/character position for the particular node in the node tree, wherein the starting byte/character position describes a start position in the XML document at which the particular node starts;
    utilizing the node level and depth-first node identifier of the particular node to determine an ending byte/character position for the particular node in the node tree, wherein the ending byte/character position describes an end position in the XML document at which the particular node ends;
    retrieving the particular line of code that is associated with the particular node in accordance with the starting byte/character position and the ending byte position; and removing the unexecutable code from the particular line of code that is associated with the particular node.

2. The method of claim 1, further comprising:

assigning a classification to each node, in the node tree, as an element name, an element value, an attribute name or an attribute value, wherein the element name is a name of an XML element, the element value is a data value for the element name, the attribute name is a name of an XML attribute, and the attribute value is a data value of the attribute name;

determining the starting byte/character position for the element name by the equation:

starting position of the element name=num$EN$*(maxLength$EN$+2)+num$EV$*maxLength$EV$+num$AN$*(maxLength$AN$+maxLength-$AV$+4)+num$LD$*(maxLength$EN$+3)+2;

determining the starting byte/character position for the element value by the equation:

Starting position of an Element Value=num$EN$*(maxLength$EN$+2)+num$EV$*maxLength$EV$+num$AN$*(maxLength$AN$+maxLength$AV$+4)+num$LD$*(maxLength$EN$+3)+1;

determining the starting byte/character position for the attribute name by the equation:

Starting position of an Attribute Name=num$EN$*(maxLength$EN$+2)+num$EV$*maxLength$EV$+num$AN$*(maxLength$AN$+maxLength$AV$+4)+num$LD$*(maxLength$EN$+3)+1;

determining the starting byte/character position for the attribute value by the equation:

Starting position of an Attribute Value=Starting position of the Attribute Name+maxLength$AN$+2, wherein:

numEN equals a Number of Element Nodes before the particular node whose starting position needs to be computed, wherein all nodes are in depth-first order;

numEV equals a Number of Element Values before the particular node whose starting position needs to be computed, wherein all nodes are in depth-first order;

numAN equals a Number of Attributed before the particular node whose starting position needs to be computed, wherein all nodes are in depth-first order;

numLD equals a Number of Level Decreases before the particular node whose starting position needs to be computed, wherein all nodes are in depth-first order;

maxLengthEN equals a Maximum byte length allocated for an Element Node;

maxLengthEV equals a Maximum byte length allocated for an Element Value;

maxLengthAN equals a Maximum byte length allocated for an Attribute Name; and maxLengthAV equals a Maximum byte length allocated for an Attribute Value; and adjusting encoding of the XML document to compensate for characters that require more than one byte for representation.

3. A system comprising:

a processor;

a data bus coupled to the processor;

a memory coupled to the data bus; and a computer-usable medium embodying computer program code, the computer program code comprising instructions executable by the processor and configured for mapping and retrieving Extensible Markup Language (XML) code by:

padding each line of code in an XML document with unexecutable code to bring a total size of each line of code to a predetermined size;

creating a node tree for the XML document, wherein each line of code in the XML document is represented by a node in the node tree;

assigning breadth-first order node identifiers to each node in the node tree;

mapping the breadth-first order node identifiers to corresponding depth-first node identifiers;

based on the corresponding depth-first node identifiers, determining a node level of a particular node in the node tree;

utilizing the node level and depth-first node identifier of the particular node to determine a starting byte position for the particular node in the node tree, wherein the starting byte position describes a start position in memory at which the particular line of code that is associated with the particular node starts;

utilizing the node level and depth-first node identifier of the particular node to determine an ending byte position for the particular node in the node tree, wherein the ending byte position describes an end position in memory at which the particular line of code that is associated with the particular node ends;

retrieving the particular line of code that is associated with the particular node in accordance with the starting byte position and the ending byte position; and removing the unexecutable code from the particular line of code that is associated with the particular node.

4. The system of claim 3, wherein the instructions are further configured for:

assigning a classification to each node, in the node tree, as an element name, an element value, an attribute name or an attribute value, wherein the element name is a name of a section of XML code in the XML document, the element value is a data value for the element name, the attribute name is a name of an element named by the element name, and the attribute value is a data value of the attribute name;

determining the starting byte/character position for the element name by the equation:

starting position of the element name=num$EN$*(maxLength$EN$+2)+num$EV$*maxLength$EV$+num$AN$*(maxLength$AN$+maxLength$AV$+4)+num$LD$*(maxLength$EN$+3)+2;

determining the starting byte/character position for the element value by the equation:

Starting position of an Element Value=num$EN$*(maxLength$EN$+2)+num$EV$*maxLength$EV$+num$AN$*(maxLength$AN$+maxLength$AV$+4)+num$LD$*(maxLength$EN$+3)+1;

determining the starting byte/character position for the attribute name by the equation:

Starting position of an Attribute Name=num$EN$*(maxLength$EN$+2)+num$EV$*maxLength$EV$+num$AN$*(maxLength$AN$+maxLength$AV$+4)+num$LD$*(maxLength$EN$+3)+1; and determining the starting byte/character position for the attribute value by the equation:

Starting position of an Attribute Value=Starting position of the Attribute Name+maxLength$AN$+2, wherein:

numEN equals a Number of Element Nodes before the particular node whose starting position needs to be computed, wherein all nodes are in depth-first order;

numEV equals a Number of Element Values before the particular node whose starting position needs to be computed, wherein all nodes are in depth-first order;

numAN equals a Number of Attributed before the particular node whose starting position needs to be computed, wherein all nodes are in depth-first order;

numLD equals a Number of Level Decreases before the particular node whose starting position needs to be computed, wherein all nodes are in depth-first order;

maxLengthEN equals a Maximum byte length allocated for an Element Node;

maxLengthEV equals a Maximum byte length allocated for an Element Value;

maxLengthAN equals a Maximum byte length allocated for an Attribute Name; and maxLengthAV equals a Maximum byte length allocated for an Attribute Value; and adjusting encoding of the XML document to compensate for characters that require more than one byte for representation.

5. A computer program product for managing heterogeneous data, the computer program product comprising:

A computer usable storage device having computer usable program code stored therein for causing a computer hardware system to perform various operations, the computer usable program code comprising:

computer usable program code configured for padding each line of code in an XML document with unexecutable code to bring a total size of each line of code to a predetermined size;

computer usable program code configured for creating a node tree for the XML document, wherein each line of code in the XML document is represented by a node in a tree;

computer usable program code configured for assigning breadth-first order node identifiers to each node in the node tree;

computer usable program code configured for mapping the breadth-first order node identifiers to corresponding depth-first node identifiers;

computer usable program code configured for, based on the corresponding depth-first node identifiers, determining a node level of a particular node in the node tree;

computer usable program code configured for utilizing the node level and depth-first node identifier of the particular node to determine a starting byte position for the particular node in the node tree, wherein the starting byte position describes a start position in memory at which the particular line of code that is associated with the particular node starts;

computer usable program code configured for utilizing the node level and depth-first node identifier of the particular node to determine an ending byte position for the particular node in the node tree, wherein the ending byte position describes an end position in memory at which the particular line of code that is associated with the particular node ends;

computer usable program code configured for retrieving the particular line of code that is associated with the particular node in accordance with the starting byte position and the ending byte position; and computer usable program code configured for removing the unexecutable code from the particular line of code that is associated with the particular node.

6. The computer program product of claim 5, wherein the computer usable program code further comprises:

computer usable program code configured for assigning a classification to each node, in the node tree, as an element name, an element value, an attribute name or an attribute value, wherein the element name is a name of a section of XML code in the XML document, the element value is a data value for the element name, the attribute name is a name of an element named by the element name, and the attribute value is a data value of the attribute name;

computer usable program code configured for determining the starting byte position for the element name by the equation:

starting position of the element name=num$EN$*(maxLength$EN$+2)+num$EV$*maxLength$EV$+num$AN$*(maxLength$AN$+maxLength$AV$+4)+num$LD$*(maxLength$EN$+3)+2;

computer usable program code configured for determining the starting byte position for the element value by the equation:

Starting position of an Element Value=num$EN$*(maxLength$EN$+2)+num$EV$*maxLength$EV$+num$AN$*(maxLength$AN$+maxLength$AV$+4)+num$LD$*(maxLength$EN$+3)+1;

computer usable program code configured for determining the starting byte position for the attribute name by the equation:

Starting position of an Attribute Name=num$EN$*(maxLength$EN$+2)+num$EV$*maxLength$EV$+num$AN$*(maxLength$AN$+maxLength$AV$+4)+num$LD$*(maxLength$EN$+3)+1; and computer usable program code configured for determining the starting byte position for the attribute value by the equation:

Starting position of an Attribute Value=Starting position of the Attribute Name+maxLength$AN$+2, wherein:

numEN equals a Number of Element Nodes before the particular node whose starting position needs to be computed, wherein all nodes are in depth-first order;

numEV equals a Number of Element Values before the particular node whose starting position needs to be computed, wherein all nodes are in depth-first order;

numAN equals a Number of Attributed before the particular node whose starting position needs to be computed, wherein all nodes are in depth-first order;

numLD equals a Number of Level Decreases before the particular node whose starting position needs to be computed, wherein all nodes are in depth-first order;

maxLengthEN equals a Maximum byte length allocated for an Element Node;

maxLengthEV equals a Maximum byte length allocated for an Element Value;

maxLengthAN equals a Maximum byte length allocated for an Attribute Name; and maxLengthAV equals a Maximum byte length allocated for an Attribute Value.

* * * * *